US012408660B2

(12) United States Patent
Jessop (10) Patent No.: US 12,408,660 B2
(45) Date of Patent: Sep. 9, 2025

(54) RECIPROCATING PRESSURE PERFUSION SYSTEM AND METHODS

(71) Applicant: Vascular Perfusion Solutions, Inc., San Antonio, TX (US)

(72) Inventor: Israel Jessop, Garden Ridge, TX (US)

(73) Assignee: Vascular Perfusion Solutions, Inc., San Antonio, TX (US)

( * ) Notice: Subject to any disclaimer, the term of this patent is extended or adjusted under 35 U.S.C. 154(b) by 0 days.

(21) Appl. No.: 18/004,764

(22) PCT Filed: Jul. 8, 2021

(86) PCT No.: PCT/US2021/040896
§ 371 (c)(1),
(2) Date: Jan. 9, 2023

(87) PCT Pub. No.: WO2022/011145
PCT Pub. Date: Jan. 13, 2022

(65) Prior Publication Data
US 2023/0189792 A1    Jun. 22, 2023

Related U.S. Application Data

(60) Provisional application No. 63/049,217, filed on Jul. 8, 2020.

(51) Int. Cl.
*A01N 1/143* (2025.01)
(52) U.S. Cl.
CPC .................................. *A01N 1/143* (2025.01)
(58) Field of Classification Search
CPC .................................................. A01N 1/0247
See application file for complete search history.

(56) References Cited

U.S. PATENT DOCUMENTS

| 6,046,046 A | 4/2000 | Hassanein |
| 2007/0098694 A1 | 5/2007 | Khuri et al. |

(Continued)

FOREIGN PATENT DOCUMENTS

| AU | 2021306319 B2 | 12/2023 | |
| CA | 3185235 C | 5/2024 | |
| DE | 10236412 A1 * | 2/2004 | ............... A01N 1/02 |
| WO | WO-2011038251 A1 | 3/2011 | |
| WO | WO-2022011145 A1 | 1/2022 | |

OTHER PUBLICATIONS

Krenzke et al (DE 0000 102 364 12) System for Perfusion of Isolated Heart To Be Used for Scientific Purposes, Comprising Various Valves and Receptacles for Maintaining of Function (Eng Lang Machine translation Feb. 26, 2004 (Year: 2004).*

(Continued)

*Primary Examiner* — Kara D Johnson
(74) *Attorney, Agent, or Firm* — Schwegman, Lundberg & Woessner, P.A.

(57) ABSTRACT

The present disclosure includes a perfusion system (300) for preservation of an organ or vascular tissue outside the body, and associated methods. The system can include a first fluid reservoir (308), a second fluid reservoir (307), and a perfusion circuit. The perfusion circuit can include a first perfusion pathway to couple the first fluid reservoir to tissue (314), and a second perfusion pathway to couple the second fluid reservoir to the tissue. A first set of conditions can cause fluid contained in the first fluid reservoir to flow in a first antegrade direction from the first fluid reservoir through the tissue to the second fluid reservoir. A second set conditions can cause the perfusate fluid contained in the second fluid reservoir to flow in a second antegrade direction from the second fluid reservoir through the tissue to the first fluid reservoir.

19 Claims, 8 Drawing Sheets

(56) References Cited

U.S. PATENT DOCUMENTS

| | | | |
|---|---|---|---|
| 2014/0045167 A1 | 2/2014 | Anderson et al. | |
| 2015/0158907 A1* | 6/2015 | Zhou | C12M 29/00 |
| | | | 530/399 |
| 2015/0313210 A1* | 11/2015 | Anderson | A01N 1/0247 |
| | | | 435/284.1 |
| 2019/0241856 A1* | 8/2019 | Wales | C12M 41/40 |
| 2020/0070165 A1* | 3/2020 | Shuler | C12M 23/16 |

OTHER PUBLICATIONS

"International Application Serial No. PCT/US2021/040896, International Preliminary Report on Patentability mailed Jun. 17, 2022", 7 pgs.

"International Application Serial No. PCT/US2021/040896, International Search Report mailed Nov. 3, 2021", 6 pgs.

"International Application Serial No. PCT/US2021/040896, Written Opinion mailed Nov. 3, 2021", 7 pgs.

"Australian Application Serial No. 2021306319, First Examination Report mailed Feb. 17, 2023", 3 pgs.

"Canadian Application Serial No. 3185235, Examiners Rule 86(2) Report mailed Aug. 31, 2023", 3 pgs.

"Canadian Application Serial No. 3185235, Response filed Jul. 20, 2023 to Examiners Rule 86(2) Report mailed 03-23-2", 13 pgs.

"European Application Serial No. 21748765.1, Response to Communication pursuant to Rules 161(1) and 162 EPC filed Aug. 31, 2023", 17 pgs.

\* cited by examiner

RECIPROCATING PRESSURE PERFUSION SYSTEM AND METHODS

CROSS-REFERENCE TO RELATED APPLICATIONS

This application is a U.S. National Stage Filing under 35 U.S.C. 371 from International Application No. PCT/US2021/040896, filed Jul. 8, 2021, which claims priority to U.S. Provisional Patent Application Ser. No. 63/049,217, filed Jul. 8, 2020, the contents of which are incorporated herein by reference in their entireties.

BACKGROUND

Perfusion includes the passage of fluid through the circulatory system or lymphatic system of an organ or tissue. In the human body, perfusion often refers to passage of blood through a capillary bed in tissue. Perfusion can allow for the delivery of oxygen, other dissolved gases, nutrients, and other items to the tissue. When tissue or an organ is not residing in the body, such as during transport of an organ for transplant, perfusion does not naturally occur.

SUMMARY

Perfusion systems can operate to pump an oxygen-enriched liquid or blood-based fluid through the vasculature of an organ, limb, or other body tissue. Disclosed herein are a system and associated methods for perfusion of tissue in a reciprocating manner. The system can include two fluid reservoirs for perfusate, such as flexible material or intravenous (IV) bags, or cavities at least partially bounded by a flexible membrane or diaphragm, that can operate in a cooperative fashion as a fluid pump. The two fluid reservoirs can be integrated into a perfusate circuit connected to the tissue receiving perfusion, and thereafter cooperate in an alternating fashion to pump fluid through the tissue to provide extended preservation of the tissue outside a human or animal body.

In perfusion systems designed for external perfusion of organ, limb, or other tissue, a conventional pump can be used to instigate and regulate flow of a fluid, such as a perfusate, to that tissue. The flow rate, patterns, and pulses can be adjusted using the conventional pump. However, such a conventional pump, often taking the form of a mechanical pump, can be bulky, taking up a large amount of volume relative to the rest of the perfusion system, and can often be heavy. In contrast, the systems and methods discussed herein leverage an alternating pressurized fluid reservoir system to move fluid through tissue without the assistance of a conventional pump.

In an example, a perfusion system can include a first fluid reservoir, a second fluid reservoir, and a perfusion circuit. The perfusion circuit can include a first perfusion pathway to couple the first fluid reservoir to tissue, and a second perfusion pathway to couple the second fluid reservoir to the tissue. A first set of conditions can cause fluid contained in the first fluid reservoir to flow from the first fluid reservoir through the tissue to the second fluid reservoir, the first set of conditions can include a relatively higher pressure in the first fluid reservoir compared to a relatively lower pressure in the second fluid reservoir. A second set conditions can cause the fluid contained in the second fluid reservoir to flow from the second fluid reservoir through the tissue to the first fluid reservoir, the second set of conditions including a relatively higher pressure in the second fluid reservoir compared to a relatively lower pressure in the first fluid reservoir.

In an example, a method of perfusing tissue can include applying pressure to a first fluid reservoir to induce flow of a fluid from the first fluid reservoir coupled to tissue, through the tissue coupled to a second fluid reservoir, such that fluid volume occupied by the fluid in the first fluid reservoir decreases, and fluid volume occupied by the fluid in the second fluid reservoir increases, and applying pressure to the second fluid reservoir to induce flow of the fluid from the second fluid reservoir through the tissue into the first fluid reservoir, such that the fluid volume occupied by the fluid in the second fluid reservoir decreases, and the fluid volume occupied by the fluid in the first fluid reservoir increases.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure describes, among other things, a perfusion system using two or more fluid reservoirs that may be alternately pressurized and depressurized to perfuse an organ or vascular tissue for extended preservation outside the body. The first and second fluid reservoirs may comprise, for example, flexible bags, bladders, or cavities at least partially bounded by a flexible membrane or diaphragm. The system does not require a dedicated fluid pump to assist in moving perfusate fluid back and forth between the reservoirs.

Figure 1A:
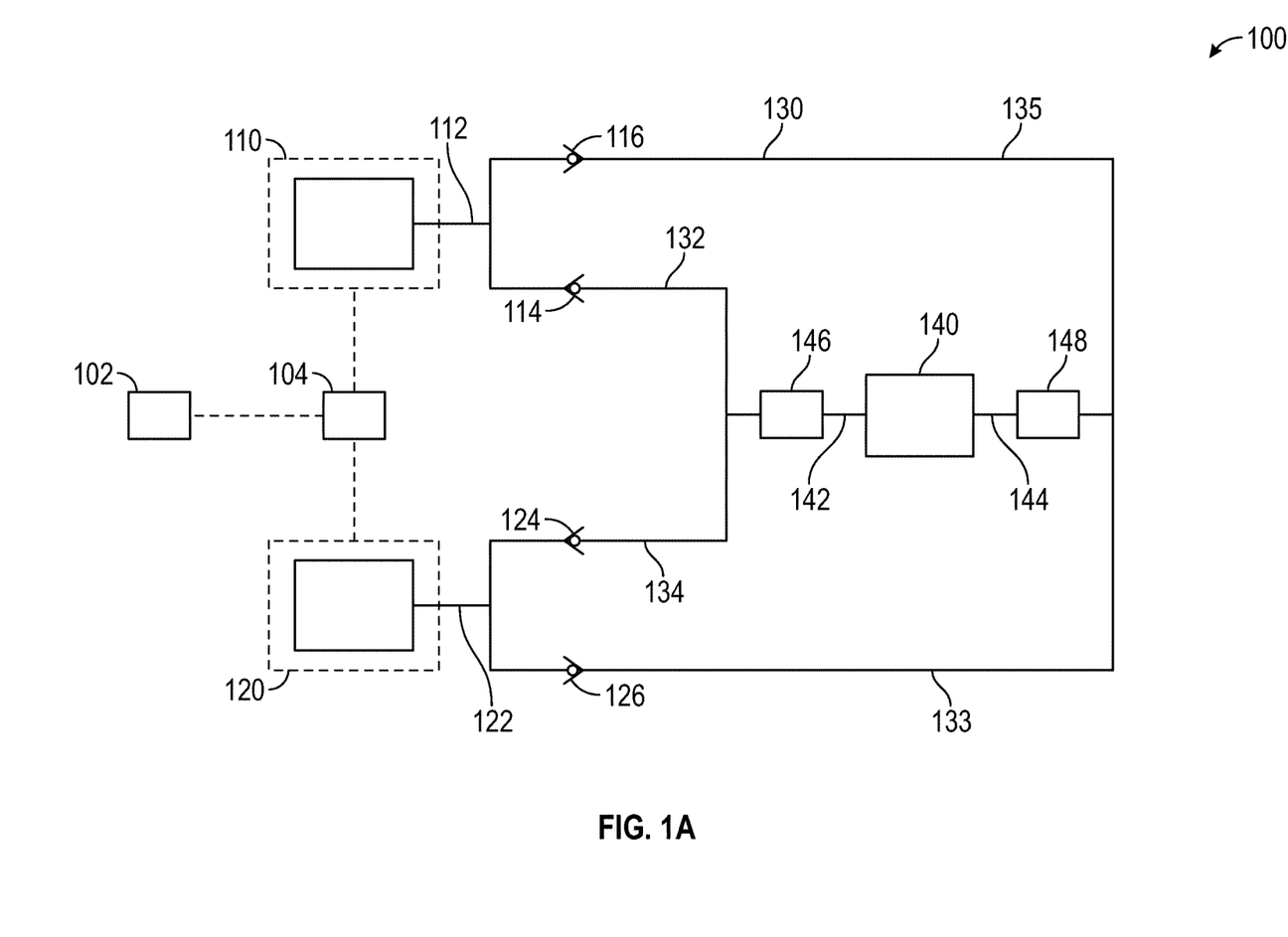
FIG. 1A illustrates a schematic diagram of a reciprocating pressure perfusion system.
Figure 1B:
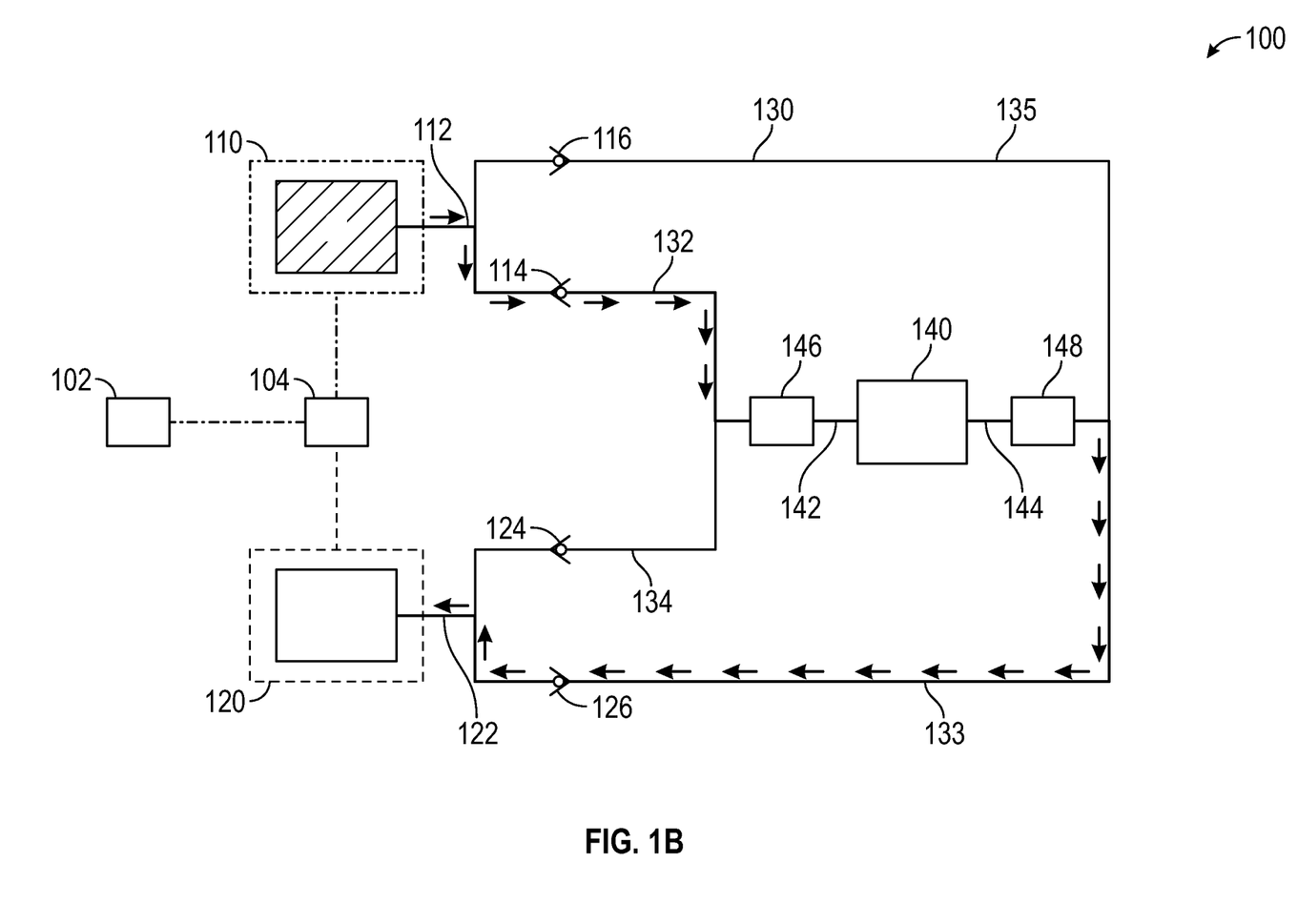
FIG. 1B illustrates a schematic diagram of a reciprocating pressure perfusion system pumping fluid in a first direction.
Figure 1C:
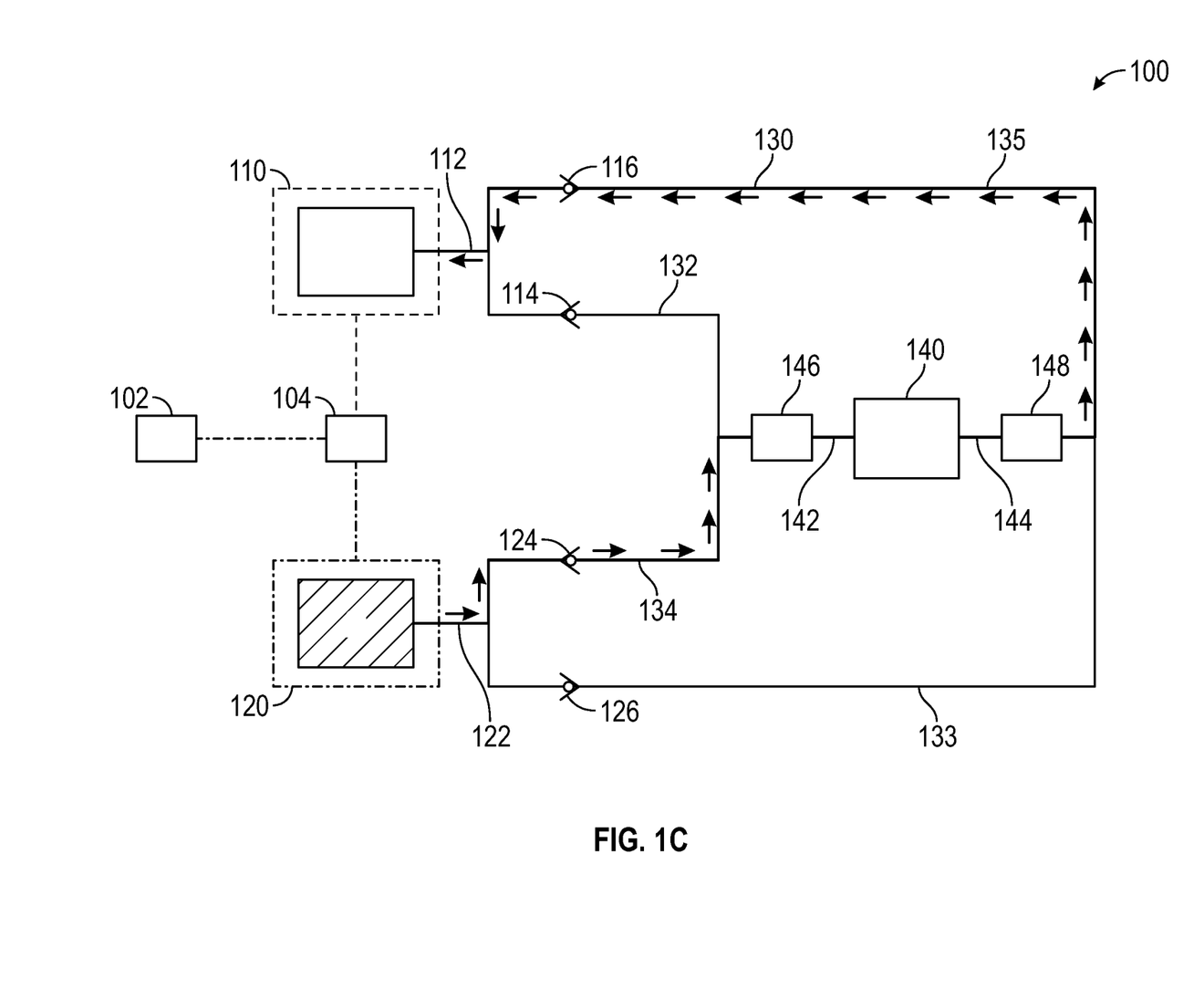
FIG. 1C illustrates a schematic diagram of a reciprocating pressure perfusion system pumping fluid in a second direction.

FIG. 1A illustrates a schematic diagram of a reciprocating pressure perfusion system 100. FIG. 1B illustrates the reciprocating pressure perfusion system 100 pumping perfusate fluid in a first antegrade direction. FIG. 1C illustrates the reciprocating pressure perfusion system 100 pumping perfusate fluid in a second antegrade direction.

The reciprocating pressure perfusion system 100 can include an external source of pressurized fluid 102, a directional control valve 104, a first fluid reservoir 110 with inlet/outlet 112, one-way check valves 114, 116, a second fluid reservoir 120 with inlet/outlet 122, one-way check valves 124, 126, a perfusion circuit 130 with first reservoir circuit portion 132, second portion 133, third portion 134, and fourth portion 135, and target tissue compartment 140 with inlet 142 and outlet 144 and optional elements 146, 148.

In system 100, the source of pressurized fluid 102 and the directional control valve 104 may be actuatable to compress or allow expansion of the first fluid reservoir 110 and the second fluid reservoir 120 in an alternating fashion. The first fluid reservoir 110 may be fluidly coupled to the first and second reservoir circuit portions 132, 133, of the perfusate circuit 130 to allow for movement of perfusate fluid between the first fluid reservoir 110 and the target tissue compartment 140. In this case, the third and fourth portions 134, 135, of the perfusate circuit 130 can be blocked by the one-way check valves 116 and 124. The second fluid reservoir 120 can be fluidly coupled to the third and fourth reservoir circuit portions 134, 135, of the perfusate circuit 130 to allow for movement of perfusate fluid between the second fluid reservoir 120 and the target tissue compartment 140. In this case, the first and second reservoir portions 132, 133, of the perfusate circuit 130 can be blocked by the one-way check valves 126 and 114.

The external source of pressurized fluid 102 may be for providing pressure or depressurizing the fluid reservoirs 110, 120, by the application of an external pressurized fluid to provide that pressure or remove it. The external source of pressurized fluid 102 can optionally include a pressure regulator to maintain a set driving pressure on fluid reservoirs 110 and 120.

The directional control valve 104 can operate to alternately pressurize and depressurize each fluid reservoir 110, 120. The directional control valve 104 may comprise, for example, a five-way valve capable of operating in either of two positions. In the first valve position the fluid reservoir 110 is pressurized by pressurized fluid connection to source of pressurized fluid 102, while the fluid reservoir 120 is depressurized by pressurized fluid connection to atmosphere. In the second valve position the fluid reservoir 120 is pressurized by fluid connection to the source of pressurized fluid 102, while the fluid reservoir 110 is depressurized by fluid connection to atmosphere.

Pressurization of the fluid reservoirs by the external source of pressurized fluid 102, which may comprise a compressed gas, can occur by the pressurized fluid acting externally on the fluid reservoirs 110, 120. Thus, in some embodiments, the pressurized fluid source 102 can be utilized to provide a force that acts on the fluid reservoirs 110, 120 to compress them in an alternating fashion. In other examples, mechanical compression of the fluid reservoirs 110, 120 can occur by contacting the fluid reservoirs 110, 120 with solid machine components that apply a radially inward force, or a unitary, direct compressive force to compress the applicable reservoir, urging the perfusate fluid contained therein to move out of the compressed reservoir, and thus to circulate within the perfusate circuit 130.

In some examples, a mechanical trigger or press may comprise used instead of the external source of pressurized fluid 102 to alternatively compress the first fluid reservoir 110 or the second fluid reservoir 120. In some embodiments, the mechanism for inflating and deflating (e.g., expanding and compressing, respectively) the fluid reservoirs 110, 120, can be gravity induced.

The first fluid reservoir 110 and the second fluid reservoir 120 may comprise bladders, compressible and flexible bags such as an intravenous fluid bag (IV bag), or other types of flexible reservoirs that can be inflated and deflated by external pressure. The fluid reservoirs 110, 120, can have a volume of about 250 mL to about 2000 mL. The perfusate may comprise saline, Krebs-Henseleit (KH) Buffer, heparinized blood, University of Wisconsin Machine Perfusion Solution, or a crystalloid or colloid solution using Hemoglobin Based Oxygen Carriers (HBOC), or others. The perfusate may include oxygenated-enriched with oxygen partial pressure ranging between 100 mm Hg and 760 mm Hg at normal atmospheric pressures. The source of pressurized gas 102 can have pressures ranging from 5 mm Hg to 150 mm Hg (with respect to atmosphere). The fluid reservoirs 110, 120, may include, for example, a plastic or polymer material that is flexible, thin, and strong, such that the reservoirs can pressurize or depressurize, but not pop or leak, when mechanical pressure is applied. In some examples, the fluid reservoirs 110, 120 may comprise IV bags. In some examples, the fluid reservoirs 110, 120, can be pressurized and depressurized by application of one or more pressure cuffs disposed around the periphery of such flexible bags or bladders.

The fluid reservoirs 110, 120, can hold a perfusate, blood, saline, or other appropriate perfusate fluid for perfusion of an organ or target tissue in the target tissue compartment 140. The perfusate fluid may comprise, for example, oxygen-enriched fluid or blood-based fluid, to provide oxygen to the target tissue, organ, or limb. The organ or target tissue may comprise a heart, lung, kidney, or other vascular tissue requiring oxygenation while outside the body.

The inlet/outlet 112 of the first fluid reservoir 110 and the inlet/outlet 122 of the second fluid reservoir 120, may be fluidly coupled to the perfusion circuit 130. In some embodiments, the inlet/outlet 112, 122 for each reservoir 110, 120 can be separated into distinct inlets and outlets. The perfusate fluid can run through the inlet/outlet 112, 122 and into the perfusion circuit 130. Specifically, with the switch 104 in Position 1, perfusate fluid from the first fluid reservoir 110 can run through the inlet/outlet 112 to the first circuit portion 132, then through the elements 140, 142, 144, 146, and 148, to the second circuit portion 133, and into fluid reservoir 120 as illustrated in FIG. 1.B. With the switch 104 in Position 2, perfusate fluid from the second fluid reservoir 120 can run through the inlet/outlet 122 to the third circuit portion 134, then through the elements 140, 142, 144, 146, and 148, through the fourth circuit portion 134, and into fluid reservoir 110 as illustrated in FIG. 1.C.

In either case, the perfusate fluid can run in an antegrade fashion through the perfusion circuit 130, through the tissue or organ in the target tissue compartment 140, entering through the inlet 142. The perfusate fluid can exit the compartment 140 through the outlet 144, and flow back through the respective portion of the perfusion circuit 130 to the respective fluid reservoir. In some embodiments, where retrograde perfusion is preferable to antegrade perfusion, the perfusion circuit 130 can be connected to the organ in a manner to perfuse the organ in a retrograde direction.

In embodiments where bi-directional perfusion is tolerated by the tissue or organ, the perfusion apparatus may comprise simplified to a single fluid path (without one-way valves) allowing perfusate fluid to flow in alternating directions through the organ (antegrade and retrograde) as the perfusate fluid traverses back and forth between reservoirs 110 and 120.

The perfusion circuit 130 can include, for example, tubing, piping, or hosing, or other types of channels to carry the perfusate fluid between the fluid reservoirs 110, 120, and the target tissue compartment 140.

The target tissue compartment 140 can be sized, shaped, or arranged, for placement and hook-up of an organ or other tissue needing vascular perfusion outside the body, such as for transport. The organ or tissue can be hooked up (e.g., using one or more catheters) such that it receives perfusate fluid from the inlet 142, the perfusate fluid runs through the tissue, and the perfusate fluid exits outlet 144 back towards one of the fluid reservoirs 110, 120. Example tissue can include an organ such as a heart or kidney, other portions of vascular tissue, or a limb. The target tissue compartment 140 can optionally include a pressure regulator, such as a liquid pressure regulator or relief valve for preventing over pressurization of the organ therein.

The optional elements 146, 148, can be situated in or near the inlet 142 and the outlet 144 of the target tissue compartment 140. The optional elements 146, 148 can be in line with the target tissue compartment 140 to form a portion of the perfusion circuit 130. The elements 146, 148, can include components such as a pressure regulator, a flow regulator, a filter, a humidifier, a gas injector, a liquid injector, a gas exchanger, an oxygenator, a heat exchanger, a gas separator, a pulse inducing element, a pulse modulating element, a dialysis system, a mechanism for adding nutrients, a mechanism for removing waste, a nutrient infusion system, a drug infusion system, on-board sensors, sampling ports, access points for ultrasonic flowmeters or oximeters, pressure relief valves, combinations thereof, or other suitable components.

For example, pressure and flow regulators can be used as one of the elements 146, 148, in line with the target tissue compartment to monitor and regulate the pressure of perfusate fluid flowing from the reservoirs 110, 120 through the tissue, and to monitor and regulate the flow of perfusate fluid flowing from the reservoirs 110, 120 through the tissue. Monitoring and regulating pressure and flow of the perfusate fluid can affect, for example, how quickly and efficiently oxygen or nutrients from the perfusate fluid are reaching the tissue. The flow and pressure can also affect how quickly the alternating fluid reservoirs pressurize and depressurize.

The elements 146, 148 may comprise one or more filters to filter perfusate fluid that enters and/or exits the tissue compartment 140. Such filters can include, for example, a particulate filter, a filter for removing contaminants in the perfusate fluid, a filter directed to chemicals or dissolved gases, or any other type of appropriate filter for treatment of the perfusate fluid. In any example of the reciprocating pressure perfusion system disclosed herein, multiple filters can be used. In some embodiments, a filter may be disposed upstream of the tissue compartment 140 so as to filter the perfusate fluid prior to reaching the tissue or organ being perfused. In some embodiments, the filter may be disposed downstream of the tissue compartment 140 so that perfusate fluid returning to the reservoir is filtered.

A liquid injector, gas injector, gas exchanger, oxygenator, gas separator can be used as one of the elements 146, 148, to regulate the amount and types of water, liquid, and dissolved gases that are present in the perfusate fluid flow. Similarly, liquid or gas injectors may be used to insert other fluids into the perfusate fluid, such as dissolved hydrogen, that may work with dissolved oxygen to provide better perfusion.

A heat exchanger or other temperature regulator as one of the elements 146, 148, can include, for example, heat absorption material in line with the perfusion circuit. In some embodiments, the heat exchanger may comprise a fin type or plate type heat exchanger. In some embodiments, the heat exchanger may comprise a cross-flow type heat exchanger. In any case, a heat exchanger can be used to reduce, increase, or regulate the temperature of the perfusate fluid prior to entering the tissue compartment 140, or as the perfusate fluid exits the tissue compartment 140, or both.

A pulse inducing element or a pulse modulating element used as one of the elements 146, 148, to regulate the tempo at which the fluid reservoirs 110, 120, are inflated and deflated, and subsequently to deliver the perfusate fluid to the tissue compartment 140 according to a selected timing, pattern, and/or length of pulse. Such an element may comprise, for example, a mechanical element or regulator.

A dialysis system or other mechanism for removing waste may be used as one or more of the elements 146, 148, to be integrated into the system 100 upstream or downstream of the tissue compartment 140 in some embodiments. Such components may be configured to remove particular types of gaseous or liquid waste from the perfusate fluid stream, such as by using sorbents to process waste.

Mechanisms for adding nutrients, such as a nutrient infusion system, a drug infusion system, can also be integrated into the system 100 as one or more of the elements 146, 148. These types of systems can allow for insertion into the perfusate fluid of particular nutrients electrolytes, biological compounds, and drugs, as desired, to treat the target tissue or organ.

On-board sensors, sampling ports (for direct access to the perfusate fluid in the perfusion circuit 130, to measure its chemical characteristics, for example), and access points (for indirect access to the perfusate fluid in the perfusion circuit 130, to measure the quantity of flow using an clamp-on, external ultrasonic probe, for example) may be integrated into the perfusion circuit 130 as one or more of the elements 146, 148 to allow for monitoring of pressure, temperature, perfusate fluid content, flow rate, and other parameters. Sensors can include sensors for pressure, flow rate, temperature, concentration or partial pressure of oxygen, concentration or partial pressure of carbon dioxide concentration, pH, electrolytes such as potassium or sodium, and/or other biochemical sensors such as for glucose, lactate, or other sugar. As desired, pressure relief valves may be integrated into the perfusion circuit 130 as elements 146, 148, or as independent elements elsewhere in the circuit 130 to allow for adjusting the operating pressure within the circuit 130 during operation.

Any of these components may be situated at, in, or on the inlet 142 of the target tissue compartment 140 to affect the perfusate fluid entering the tissue; and at, in, or on the outlet 144 of the target tissue compartment 140 to affect the perfusate fluid exiting the tissue prior to cycling back to one of the reservoirs 110, 120, or both.

When in use, the system 100 may be actuated to circulate perfusate fluid as shown in FIG. 1B or in FIG. 1C. The flow of perfusate fluid through the system 100 can be analogous to the flow of current in a rectifier circuit. In FIG. 1B, the first fluid reservoir 110 is activated such that perfusate fluid flows out of the fluid reservoir 110.

In FIG. 1B, the first fluid reservoir 110 may be deflated by mechanical pressure so that a perfusate fluid is pushed out of the first fluid reservoir 110 and into the first reservoir circuit portion 132. The mechanical pressure may be applied through external application of pressurized fluid from the pressurized fluid source 102, directed by the directional control valve 104 towards the first fluid reservoir 110. As pressure is applied and the first fluid reservoir 110 deflates, the flow of perfusate can run from the inlet/outlet 112 of the first fluid reservoir 110 into the first reservoir circuit portion 132 in an antegrade direction following the arrows A while fluid flow through the third and fourth portions 134, 135, of the perfusate fluid circuit 130 is blocked by one-way check valves 116 and 124.

The perfusate fluid can continue through the perfusate circuit 130 through the element 146 (e.g., a filter, regulator, or injector, or other component, as discussed above) into the inlet 142 of the tissue compartment 140. The perfusate fluid can oxygenate the target tissue, organ, or limb in the tissue compartment 140, and then flow out of the outlet 144 through the element 148 (e.g., a filter, regulator, or injector, or other component, as discussed above) back into the perfusate circuit 130 second portion 133 towards the second fluid reservoir 120. The second fluid reservoir 120 can receive the perfusate fluid exiting the tissue compartment 140, and gradually expand as the perfusate fluid fills the second fluid reservoir 120. This continues until the pressure in the second fluid reservoir 120 equals or exceeds the pressure in the first reservoir 110, or until the second fluid reservoir 120 can hold no more perfusate fluid.

In contrast, as shown in FIG. 1C, the perfusate fluid can originate from the second fluid reservoir 120. In this case, when the second fluid reservoir 120 contains perfusate fluid, mechanical pressure may be applied to the second fluid reservoir 120 to deflate the second reservoir and push the perfusate fluid out into the perfusate circuit 130. For example, in system 100, this may be induced by switching of the directional control valve 104 so that the source of pressurized fluid 102 provides external pressurized fluid to deflate the second fluid reservoir 120. In some examples, as noted previously, other types of mechanical pressure can be applied. As pressure is applied and the second fluid reservoir 120 deflates, the flow of perfusate can run from the inlet/outlet 122 of the second fluid reservoir 120 into the third reservoir circuit portion 134 in an antegrade direction following the arrows B.

The perfusate fluid can continue through the perfusate circuit 130 through the element 146 (e.g., a filter, regulator, or injector, or other component, as discussed above) into the inlet 142 of the tissue compartment 140. The perfusate fluid can oxygenate the target tissue, organ, or limb in the tissue compartment 140, and then flow out of the outlet 144 through the element 148 (e.g., a filter, regulator, or injector, or other component, as discussed above) back into the fourth portion 135 of the perfusate circuit 130 towards the first fluid reservoir 110. The first fluid reservoir 110 can receive the perfusate fluid exiting the tissue compartment 140, and gradually expand as the perfusate fluid fills the first fluid reservoir 110.

FIGS. 1B and 1C depict alternating flows through the perfusate circuit 130 between the first fluid reservoir 110 and the second fluid reservoir 120. The system 100 can continue to operate so that perfusate fluid flows through the target tissue, organ, or limb, without using an external, conventional pump while the first and second fluid reservoirs 110, 120 are alternatingly pressurized and depressurized. The relative pressure on each of the fluid reservoirs 110, 120 can determine whether the perfusate fluid flows through the system 100, and the position of the directional control valve 104, along with the orientation of the one-way check valves 114, 116, 124, 126 can determine the direction of the perfusate fluid flow.

In FIG. 1B, pressure from the source of pressurized fluid 102 is applied to the first fluid reservoir 110. The second fluid reservoir 120 is not pressurized. The pressurized first fluid reservoir 110 dispenses perfusate fluid through an optional one-way check valve 114 into the element 146, the target tissue compartment 140, and the element 148, in succession. The perfusate fluid from the element 148 can pass through a one-way check valve 126 down the available pathway in the perfusate circuit 130 to begin filling the second fluid reservoir 120.

In FIG. 1C, when the first fluid reservoir 110 is empty or depressurized, or the second fluid reservoir 120 contains fluid, the directional control valve 104 may be switched to permit perfusate fluid flow in a different direction. Pressurizing of the second fluid reservoir 120, and depressurizing of the first fluid reservoir 110 can then result in perfusate fluid flow in the different direction. The pressurized second fluid reservoir 120 can dispense perfusate fluid through a one-way check valve 124 into the element 146, the target tissue compartment 140, and the element 148, in succession. The perfusate fluid can then pass through a one-way check valve 116 down the available pathway in the perfusate circuit 130 to begin filling the first fluid reservoir 110.

In system 100, when the first fluid reservoir 110 is full, or the second fluid reservoir 120 is empty, the cycle can be switched to operate according to the conditions shown in FIG. 1B. In some embodiments, the perfusate fluid can flow in a different way through the system 100. For example, the perfusate fluid can flow in an antegrade direction from the first fluid reservoir 110 to the second fluid reservoir 120, followed by retrograde perfusate fluid flow from the second fluid reservoir 120 to the first fluid reservoir 110, or vice versa. The flow of the perfusate fluid through the system can be adjusted depending on the desired effect, by altering the location and orientation of the one-way check valves 114, 116, 124, 126 and the position of the switch 104.

Figure 2:
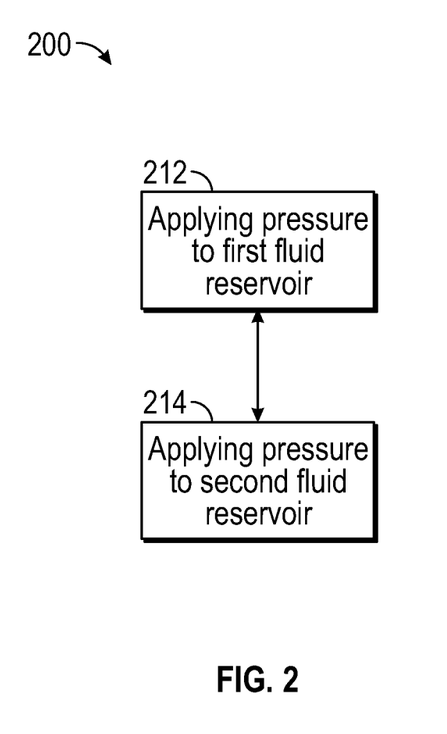
FIG. 2 illustrates a block diagram of a method of perfusing tissue in an example.

FIG. 2 illustrates a block diagram of a method 200 of perfusing tissue. Method 200 can include steps 212 to 214. In step 212, pressure can be applied to a first fluid reservoir. In step 214, pressure can be applied to a second fluid reservoir.

In step 212, pressure can be applied to the first fluid reservoir to induce flow of a fluid through tissue to the second fluid reservoir. The fluid volume in the first fluid reservoir can decrease in response, while the fluid volume in the second fluid reservoir can proportionately increase.

In step 214, pressure can be applied to the second fluid reservoir to induce flow of a fluid through tissue to the first fluid reservoir. The fluid volume in the second fluid reservoir can decrease in response, while the fluid volume in the first fluid reservoir can proportionately increase.

Applying pressure in either step 212 or 214 can include applying a compressed gas externally to the reservoir to induce flow of the fluid, or can include applying a pressurized liquid externally to the reservoir to induce flow of the fluid. In some cases, applying pressure in either step 212 or 214 can include mechanically compressing the fluid reservoir to induce flow of the fluid.

Steps 212 and 214 can be done in an alternating fashion. In some cases, pressure can be cycled between the first and second fluid reservoirs to induce fluid flow between the reservoirs. The fluid flow through the tissue can be unidirectional.

Figure 3A:
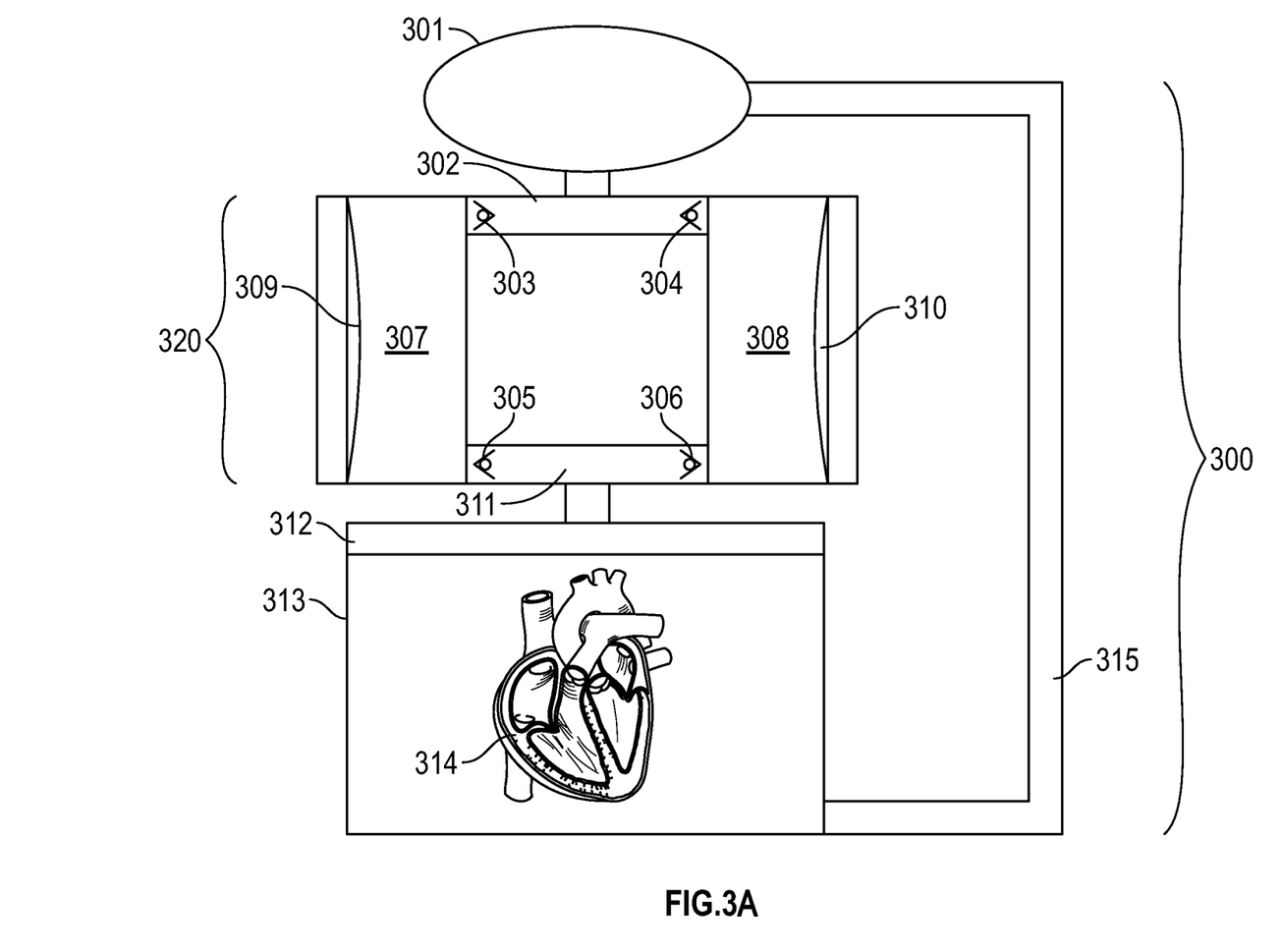
FIG. 3A illustrates a schematic diagram of a reciprocating pressure perfusion system in which the fluid is pressurized within a cavity by a diaphragm.
Figure 3B:
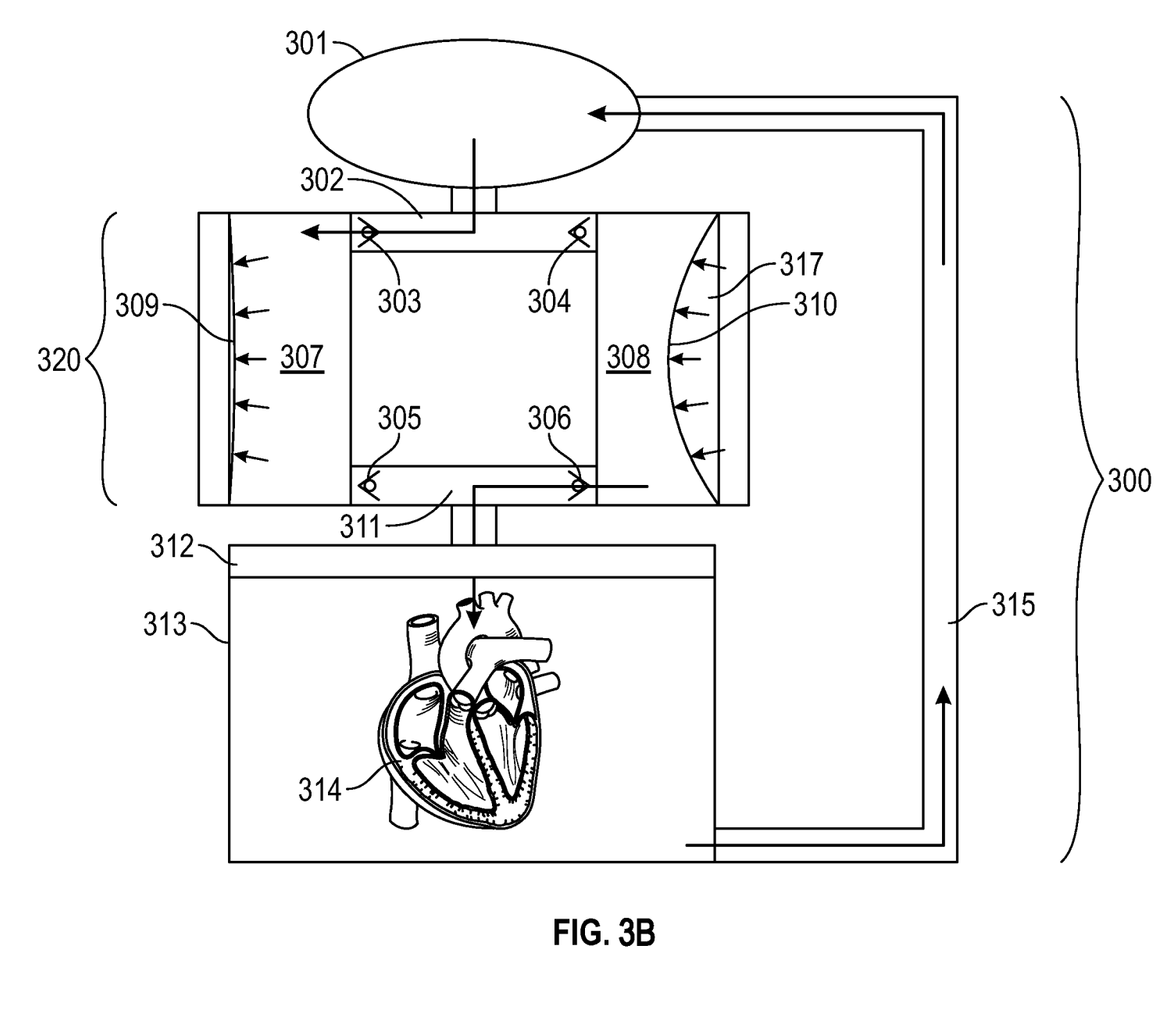
FIG. 3B illustrates a schematic diagram of a reciprocating pressure perfusion system pumping fluid in a first direction.
Figure 3C:
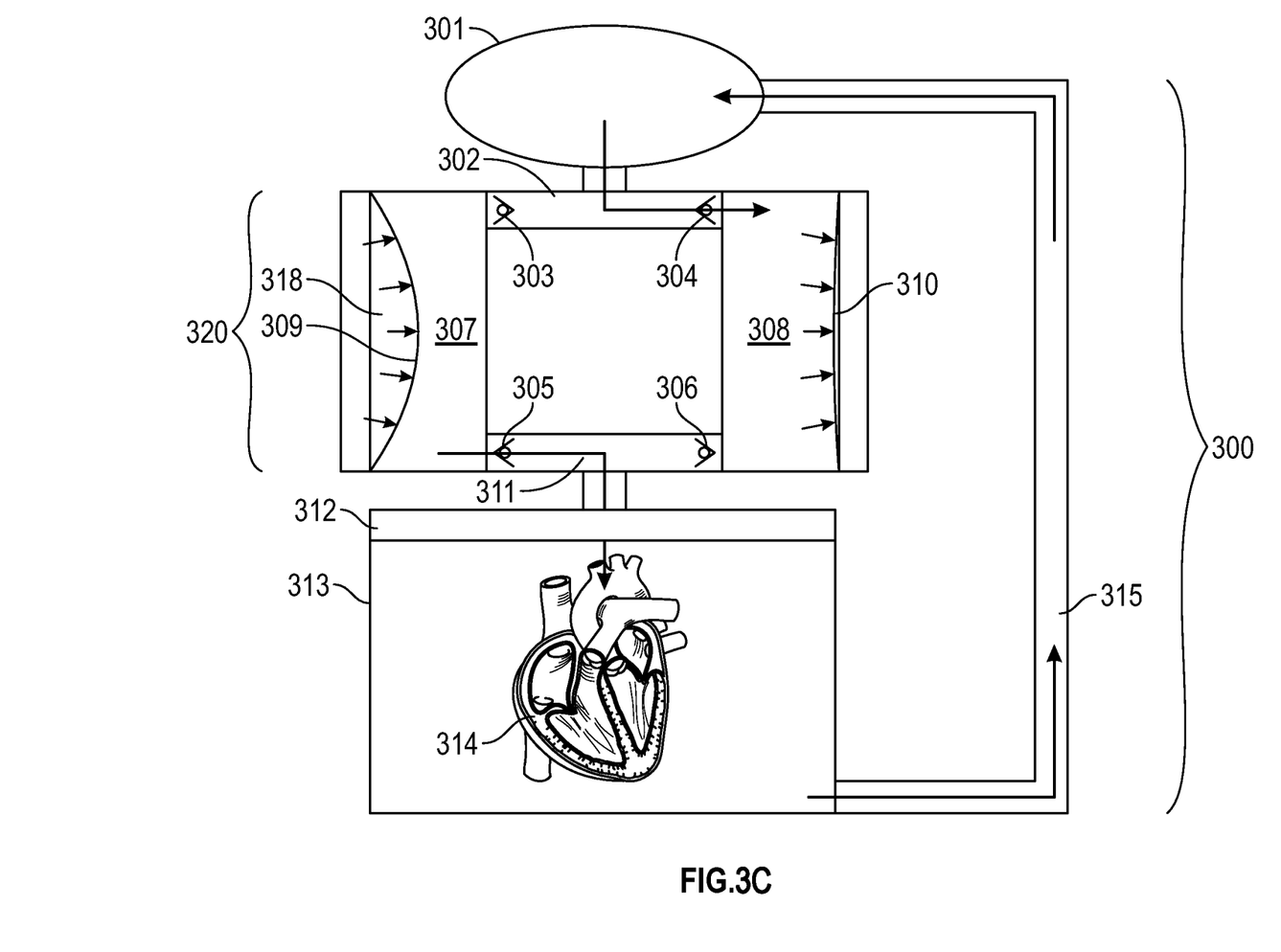
FIG. 3C illustrates a schematic diagram of a reciprocating pressure perfusion system pumping fluid in a second direction.
Figure 3D:
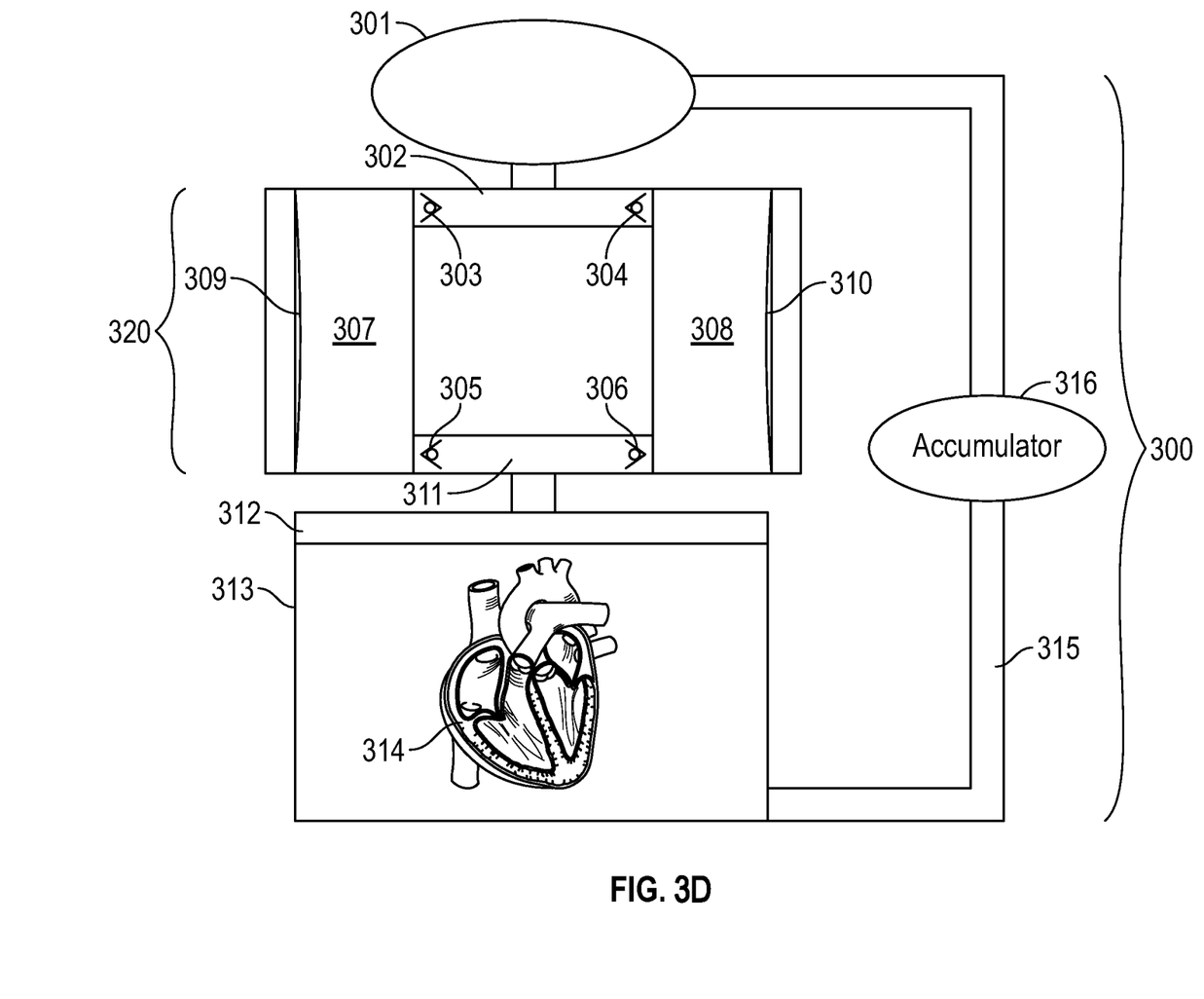
FIG. 3D illustrates a schematic diagram of a reciprocating pressure perfusion system having an elastic reservoir or accumulator to store hydraulic energy within the system.

FIGS. 3A to 3D illustrate a reciprocating pressure perfusion system 300 having membrane-bound cavities. FIG. 3A illustrates a schematic diagram of the reciprocating pressure perfusion system 300 at rest, in which the pressurized fluid reservoirs include cavities partially bounded by flexible membranes or diaphragms. FIG. 3B illustrates the system 300 pumping perfusate fluid in a first antegrade direction by means of a pressurization diaphragm. FIG. 3C illustrates the system 300 pumping perfusate fluid in a second antegrade direction with a pressurization diaphragm. FIG. 3D illustrates the system 300 having a hydraulic accumulator to store hydraulic energy within the system. FIGS. 3A to 3D will be discussed together.

The system 300 can include an oxygenator 301, a pump section 320, a fluid filter 312, and organ container 313 containing the organ 314, and a fluid recirculation path 315 back toward the oxygenator 301. The pump section 320 can include an intake manifold 302 leading to cavities 307 and 308, where each cavity is partially bounded by a flexible membrane or diaphragm 309 and 310, respectively. The intake manifold 302 can include one-way valves 303 and 304 leading from the oxygenator 301 to cavities 307 and 308, respectively. The outlet manifold 311 can have one-way valves 305 and 306 to allow fluid to flow out from cavities 307 and 308 respectively, towards the filter 312.

Perfusate fluid can be circulated through the system 300 by pressurization of the diaphragms 309 and 310 in an alternating fashion. FIG. 3B illustrates flow of perfusate in a first antegrade direction by pressurization of the diaphragm 310 using the compressed gas 317 while diaphragm 309 is vented to the surrounding environment. The distension of the diaphragm 310 reduces the liquid volume in cavity 308, pushing perfusate through the one-way valve 306 towards the filter 312, and organ 314. After flowing out of the organ 314 and into the container 313, the pressure rise within the container 313 forces fluid through the return path 315, through oxygenator 301, and into cavity 307 via the one-way valve 303. The intake of fluid to fill cavity 307 corresponds to the relaxation of the diaphragm 309.

FIG. 3C illustrates flow of perfusate in a second antegrade direction by pressurization of diaphragm 309 using compressed gas 318 while diaphragm 310 is vented to the surrounding environment. The distension of diaphragm 309 reduces the liquid volume in cavity 307, pushing perfusate through the one-way valve 305 towards the filter 312, and organ 314. After flowing out of the organ 314 and into the container 313, the pressure rise within the container 313 forces fluid through the return path 315, through oxygenator 301, and into cavity 308 via the one-way valve 304. The intake of fluid to fill cavity 308 corresponds to the relaxation of the diaphragm 310.

FIG. 3D illustrates the addition of a volumetric compliance element or hydraulic accumulator 316 to the system 300, to absorb changes in pressure caused by cycles of diaphragm pressurization and venting. The accumulator 316 functions by elastic inflation to increased inner volumes under conditions of high pressure, and elastic deflation to decreased inner volumes under conditions of low pressure. In some cases, this can instead be achieved by inclusion or injection of a controlled volume of gas within the closed system.

VARIOUS NOTES & EXAMPLES

Each of these non-limiting examples can stand on its own, or can be combined in various permutations or combinations with one or more of the other examples.

Example 1 can include a perfusion system having a first fluid reservoir, a second fluid reservoir, and a perfusion circuit. The perfusion circuit can include a first perfusion pathway to couple the first fluid reservoir to tissue, and a second perfusion pathway to couple the second fluid reservoir to the tissue. A first set of conditions can cause fluid contained in the first fluid reservoir to flow from the first fluid reservoir through the tissue to the second fluid reservoir, the first set of conditions can include a relatively higher pressure in the first fluid reservoir compared to a relatively lower pressure in the second fluid reservoir. A second set of conditions can cause the fluid contained in the second fluid reservoir to flow from the second fluid reservoir through the tissue to the first fluid reservoir, the second set of conditions including a relatively higher pressure in the second fluid reservoir compared to a relatively lower pressure in the first fluid reservoir.

Example 2 can include Examples 1, wherein the fluid flow is one of antegrade flow or retrograde flow through the tissue.

Example 3 can include any of Examples 1-2, wherein reducing a fluid volume occupied by the fluid in the first fluid reservoir can operate to increase a fluid volume occupied by the fluid in the second fluid reservoir.

Example 4 can include any of Examples 1-3, wherein the second fluid reservoir is configured to be substantially empty when the first fluid reservoir is substantially full.

Example 5 can include any of Examples 1-4, further comprising one or more pressure regulators coupled to the perfusion circuit.

Example 6 can include any of Examples 1-5, further comprising one or more flow regulators coupled to the perfusion circuit.

Example 7 can include any of Examples 1-6, further comprising one or more filters coupled to the perfusion circuit.

Example 8 can include any of Examples 1-7, further comprising one or more humidifiers in fluid communication with the perfusion circuit.

Example 9 can include any of Examples 1-8, further comprising a pressure source to exert external pressure on at least one of the first fluid reservoir or the second fluid reservoir.

Example 10 can include any of Examples 1-9, wherein the pressure source comprises a gas injector.

Example 11 can include any of Examples 1-10, wherein the pressure source comprises a liquid injector.

Example 12 can include any of Examples 1-11, wherein the pressure source comprises a mechanical press.

Example 13 can include any of Examples 1-12, further comprising a gas exchanger fluidly coupled to the first fluid reservoir or the second fluid reservoir.

Example 14 can include any of Examples 1-13, further comprising an oxygenator fluidly coupled to the first fluid reservoir or the second fluid reservoir.

Example 15 can include any of Examples 1-14, further comprising a valve to direct flow of the fluid from the first fluid reservoir or the second fluid reservoir towards the tissue.

Example 16 can include any of Examples 1-15, further comprising a heat exchanger coupled to the first or second fluid reservoir, or the perfusion circuit, the heat exchanger to regulate temperature of the fluid.

Example 17 can include any of Examples 1-16, further comprising a pulse inducing or pulse modulating element in fluid communication with the first fluid reservoir and the second fluid reservoir.

Example 18 can include any of Examples 1-17, further comprising a dialysis system in fluid communication with the perfusion circuit, the dialysis system to remove waste from the fluid.

Example 19 can include any of Examples 1-18, further comprising an infusion system coupled to the perfusion circuit, the infusion system configured to provide a drug, a nutrient, or both, to the fluid.

Example 20 can include any of Examples 1-19, further comprising one or more sensors for pressure, flow, temperature, pH, or concentrations of oxygen, carbon dioxide, glucose, lactate, or electrolytes coupled to the perfusion circuit.

Example 21 can include any of Examples 1-20, further comprising one or more sampling ports in the perfusion circuit.

Example 22 can include any of Examples 1-21, further comprising one or more access points in the perfusion circuit.

Example 23 can include any of Examples 1-22, wherein the one or more access points is to receive an ultrasonic flowmeter.

Example 24 can include any of Examples 1-23, wherein the one or more access points is to receive a noninvasive oximeter.

Example 25 can include any of Examples 1-24, further comprising one or more pressure relief valves coupled to the first or second reservoir, or the perfusion circuit.

Example 26 can include a method of perfusing tissue including applying pressure to a first fluid reservoir to induce flow of a fluid from the first fluid reservoir coupled to tissue, through the tissue coupled to a second fluid reservoir, such that fluid volume occupied by the fluid in the first fluid reservoir decreases, and fluid volume occupied by the fluid in the second fluid reservoir increases, and applying pressure to the second fluid reservoir to induce flow of the fluid from the second fluid reservoir through the tissue into the first fluid reservoir, such that the fluid volume occupied by the fluid in the second fluid reservoir decreases, and the fluid volume occupied by the fluid in the first fluid reservoir increases.

Example 27 can include Example 26, wherein applying pressure comprises applying compressed gas externally to the first fluid reservoir or the second fluid reservoir to induce flow of the fluid.

Example 28 can include any of Examples 26-27, wherein applying pressure comprises applying pressurized liquid externally to the first fluid reservoir or the second fluid reservoir to induce flow of the fluid.

Example 29 can include any of Examples 26-28, wherein applying pressure comprises applying mechanical compression to the first fluid reservoir or the second fluid reservoir to induce flow of the fluid.

Example 30 can include any of Examples 26-29, further comprising cycling pressure between the first fluid reservoir and the second fluid reservoir to induce flow of fluid therebetween, wherein the flow through the tissue is unidirectional.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A perfusion system to perfuse vascular tissue outside the body, comprising:
   a first fluid reservoir;
   a second fluid reservoir;
   a directional control valve; and
   a perfusion circuit comprising a first perfusion pathway coupling the first fluid reservoir to the tissue, and a second perfusion pathway coupling the second fluid reservoir to the tissue, the directional control valve configured to receive external pressure to alternately pressurize and depressurize each of the first fluid reservoir and the second fluid reservoir,
   wherein the directional control valve is configured such that fluid contained in the first fluid reservoir flows from the first fluid reservoir through the tissue to the second fluid reservoir in response to a relatively higher pressure in the first fluid reservoir compared to a relatively lower pressure in the second fluid reservoir, and
   wherein the fluid contained in the second fluid reservoir flows from the second fluid reservoir through the tissue to the first fluid reservoir in response to a relatively higher pressure in the second fluid reservoir compared to a relatively lower pressure in the first fluid reservoir.

2. The system of claim 1, wherein reducing a fluid volume occupied by the fluid in the first fluid reservoir operates to increase a fluid volume occupied by the fluid in the second fluid reservoir.

3. The system of claim 1, wherein the second fluid reservoir is configured to be substantially empty when the first fluid reservoir is substantially full.

4. The system of claim 1, further comprising one or more pressure regulators coupled to the perfusion circuit.

5. The system of claim 1, further comprising one or more flow regulators coupled to the perfusion circuit.

6. The system of claim 1, further comprising a pressure source to exert the external pressure on at least one of the first fluid reservoir or the second fluid reservoir.

7. The system of claim 6, wherein the pressure source comprises a gas injector, a liquid injector, a mechanical press, or a diaphragm.

8. The system of claim 1, further comprising a gas exchanger or an oxygenator fluidly coupled to the first fluid reservoir or the second fluid reservoir.

9. The system of claim 1, further comprising a valve to direct flow of the fluid from the first fluid reservoir or the second fluid reservoir towards the tissue.

10. The system of claim 1, further comprising a pulse inducing or pulse modulating element in fluid communication with the first fluid reservoir and the second fluid reservoir.

11. The system of claim 1, further comprising one or more access points in the perfusion circuit, the one or more access points to receive an ultrasonic flowmeter or a noninvasive oximeter.

12. The system of claim 1, wherein the directional control valve is configured to provide volumetric compliance of the system by controlling compressible gas volumes within the fluid circuit by injecting a pre-determined quantity of gas into the perfusion circuit.

13. The system of claim 1, wherein each of the first and second fluid reservoirs comprise a flexible membrane or diaphragm at least partially bounding the first and second fluid reservoirs, the flexible membrane or diaphragm for applying pressure to the first and second fluid reservoirs.

14. The system of claim 1 wherein the first reservoir includes a first flexible portion configured to expand or contract a first cavity of the first reservoir containing the fluid in response to the external pressure and wherein the second reservoir includes a second flexible portion configured to expand or contract a first cavity of the second reservoir contain the fluid in response to the external pressure.

15. The system of claim 14 wherein first flexible portion comprises a first membrane and the second flexible portion comprises a second membrane.

16. The system of claim 14 wherein at least one of the first flexible portion and second flexible portion comprises a flexible bag or bladder.

17. The system of claim 14 wherein contracting the first cavity causes fluid to flow out of the first cavity through the tissue and into the second cavity causing the second cavity to expand.

18. The system of claim 17 wherein contracting the second cavity causes fluid to flow out of the second cavity through the tissue and into the first cavity causing the first cavity to expand.

19. The system of claim 1 wherein the first reservoir comprises a first membrane-bound cavity and wherein the second reservoir comprises a second membrane-bound cavity.

* * * * *